Jan. 30, 1951

F. KASTEL 2,540,000

MACHINE FOR FORMING TUBULAR BODIES
FROM SHEET MATERIAL

Filed Oct. 25, 1946

Inventor
F. KASTEL

By Rule and Hoge.
Attorneys

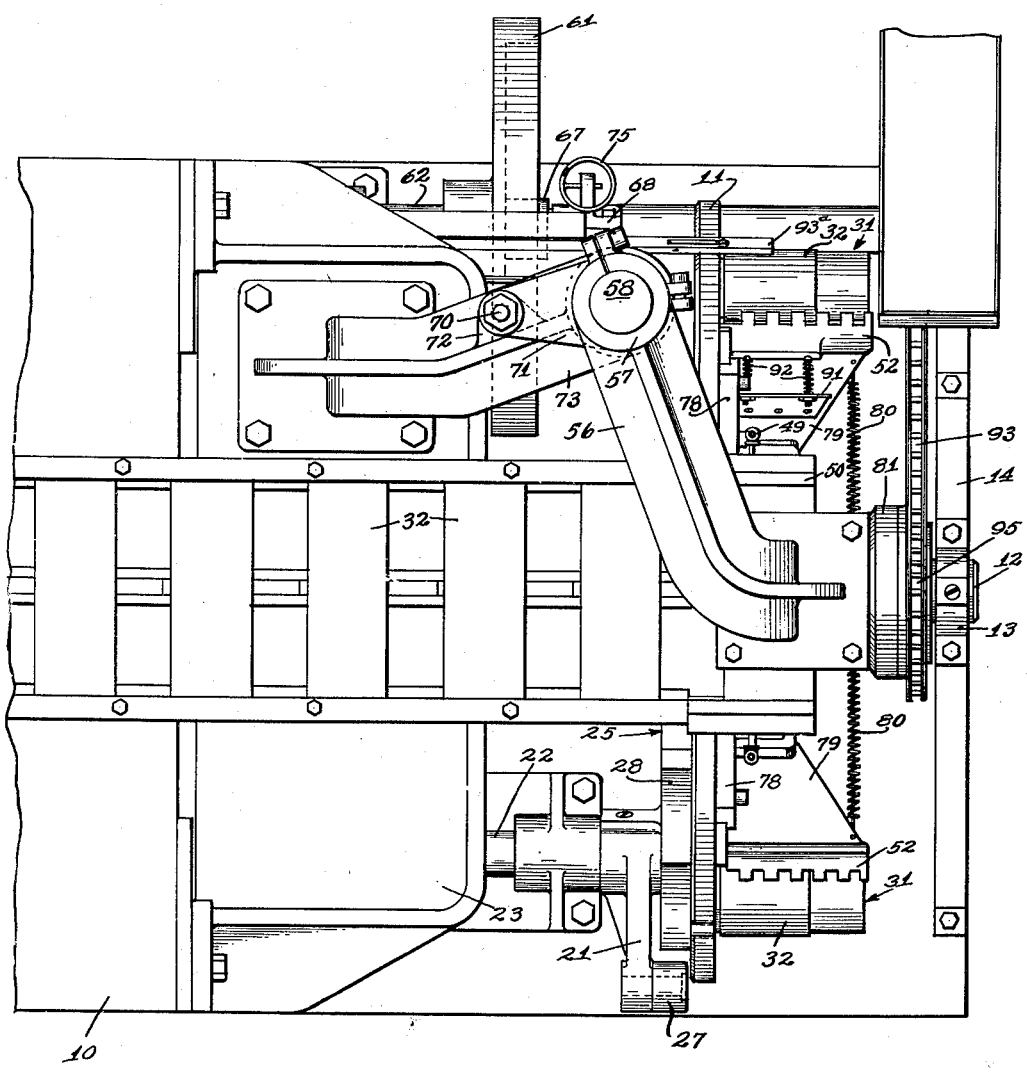

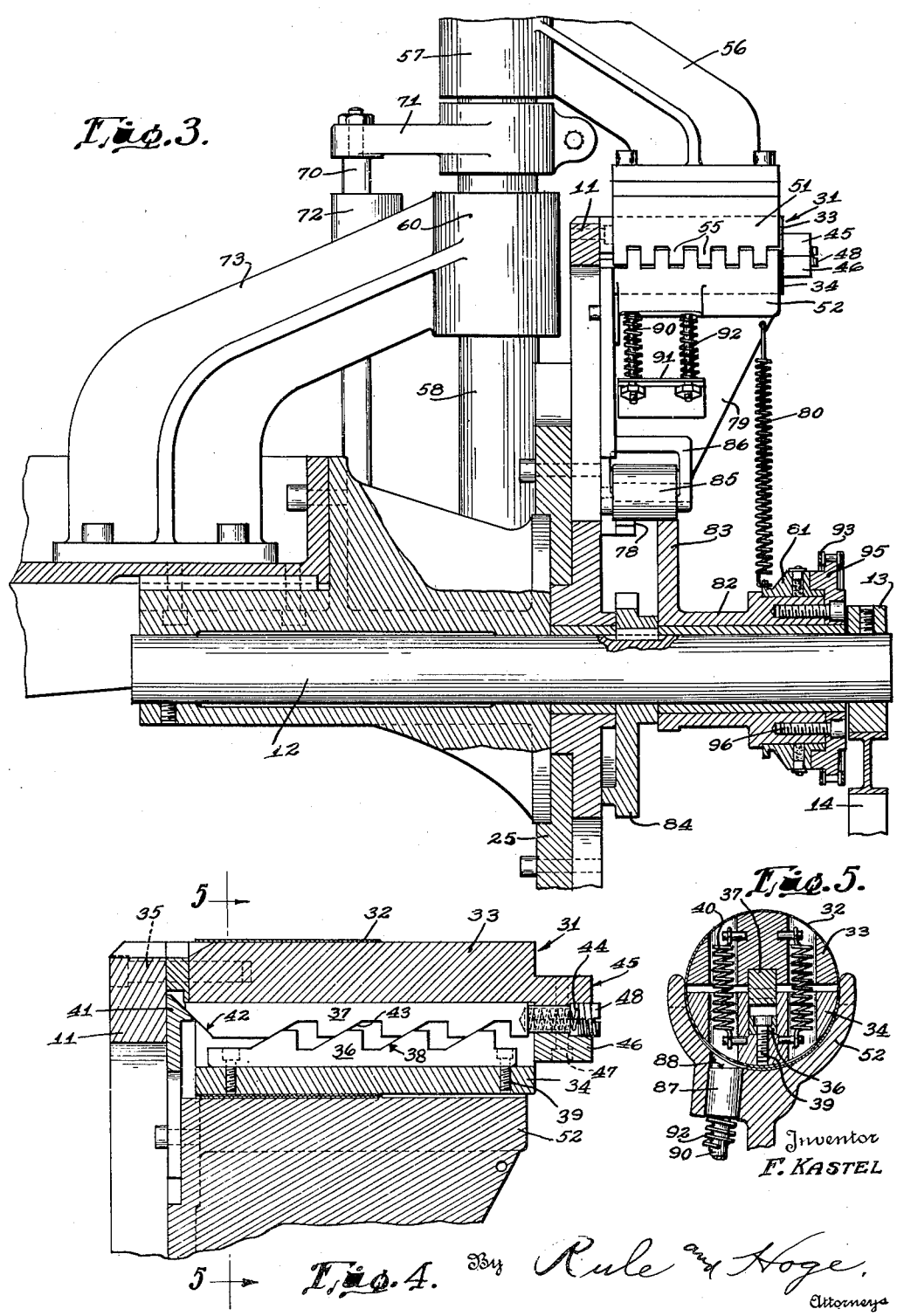

Jan. 30, 1951 F. KASTEL 2,540,000
MACHINE FOR FORMING TUBULAR BODIES
FROM SHEET MATERIAL
Filed Oct. 25, 1946 4 Sheets-Sheet 4
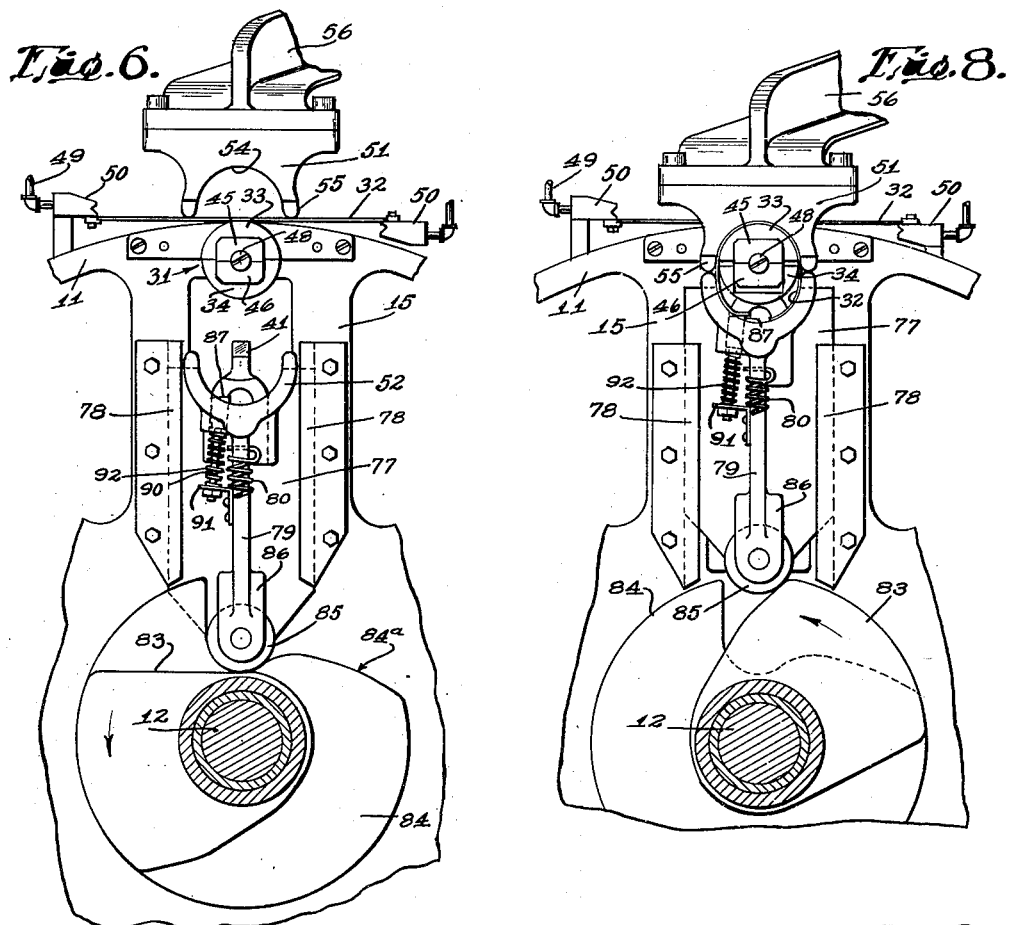
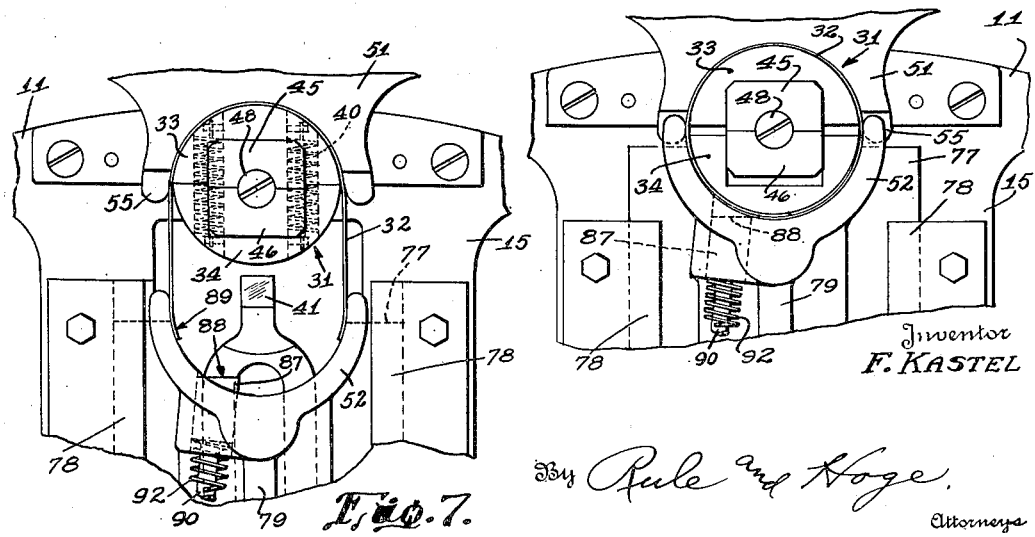
Inventor
F. KASTEL
By Rule and Hoge
Attorneys Patented Jan. 30, 1951

2,540,000

UNITED STATES PATENT OFFICE 2,540,000

MACHINE FOR FORMING TUBULAR BODIES FROM SHEET MATERIAL

Ferdinand Kastel, Baltimore, Md., assignor to Owens-Illinois Glass Company, a corporation of Ohio Application October 25, 1946, Serial No. 705,703

12 Claims. (Cl. 93—39.2)

My invention relates to a machine for forming tubes from blanks of sheet material for use as container bodies or for other purposes. The machine is adapted for rolling or shaping flat blanks to tubular form with their longitudinal edges overlapping and glued together. In machines heretofore designed for this purpose, the rate at which the tubes may be formed is limited owing to the length of time required for the glue to set and hold the overlapped edges together after the tube is formed.

An object of the present invention is to provide a machine in which tubes may be formed in rapid succession and without the necessity of waiting for the glue or adhesive to set when one tube is made, before forming a succeeding tube. To this end, the invention provides a machine with a multiplicity of tube forming horns around which the blanks can be wrapped to form tubes in rapid succession, each unit being designed to hold the overlapped and glued edges of the tube together while succeeding tubes are being shaped by the other units.

Other objects of the invention will appear hereinafter.

Referring to the accompanying drawings:

Fig. 2 is a top plan view on a larger scale;

Fig. 3 is a part-sectional elevation at the line 3—3 on Fig. 1, parts of the machine being broken away;

Fig. 4 is a sectional elevation through one of the horns, showing particularly the means for expanding the horn;

Fig. 5 is a cross-sectional view of the horn at the line 5—5 of Fig. 4;

Fig. 6 is a sectional elevation showing the relation of a horn and cooperating shaping elements just prior to the shaping operation;

Fig. 7 is a fragmentary view on a larger scale showing the upper shaping die in its lowered position, and the lower shaping or wrapping member moved upward to an intermediate position during the shaping operation;

Fig. 8 is a view similar to Fig. 6 showing the parts in a more advanced position; and Fig. 9 is a view similar to Fig. 7 showing the completely formed tube clamped between the horn and the shaping dies.

Figure 1:
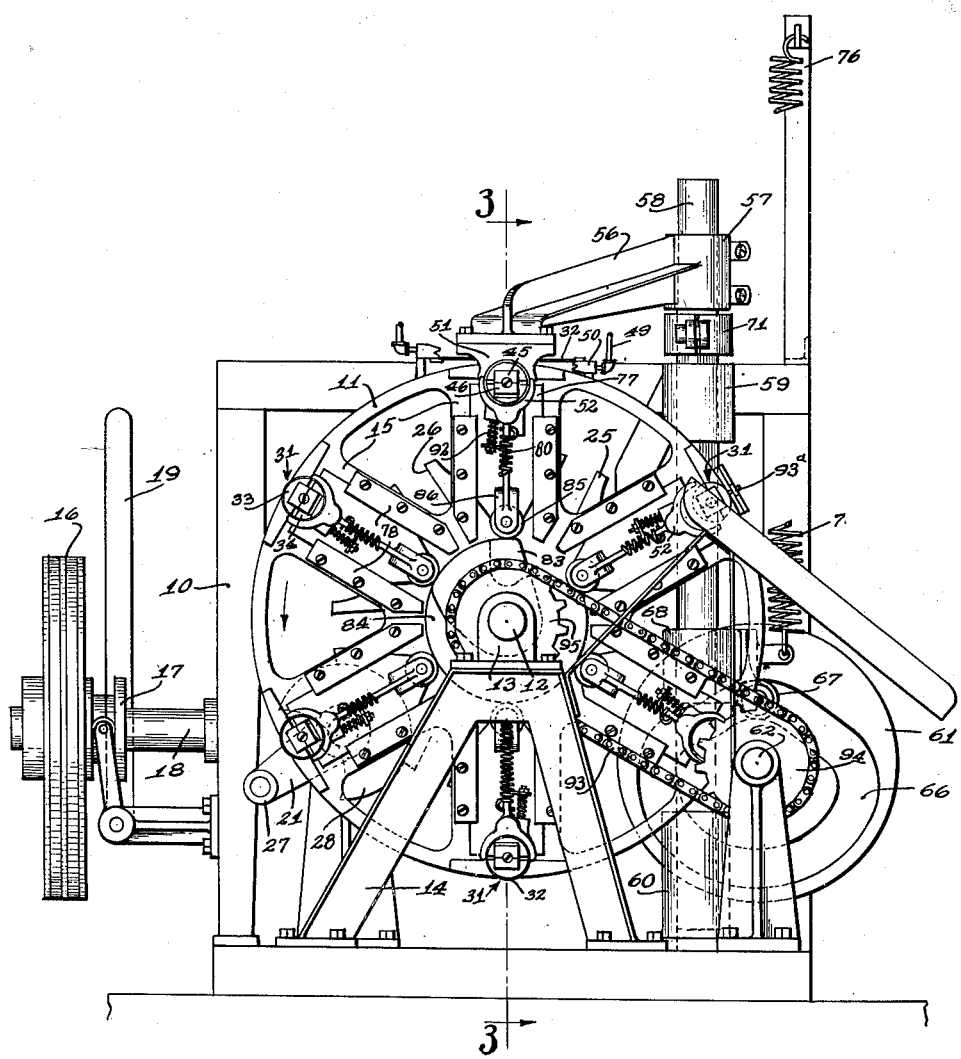
Fig. 1 is an elevational view of the machine.

Referring to Fig. 1, the machine comprises a stationary framework 10 and a carriage 11 mounted for intermittent step-by-step rotation about the axis of a horizontal shaft 12 having a fixed mounting on the machine frame. One end of the shaft is supported in a bearing block 13 (Figs. 1 and 3) mounted on a standard 14 bolted to or forming part of the machine frame. The carriage 11 is in the form of a wheel or spider having radial arms 15 carrying tube shaping units arranged in an annular series and uniformly spaced at 60° around the axis of the shaft 12. The carriage is rotated intermittently step-by-step to bring the units in succession to the forming station.

The means for driving the carriage comprises a continuously rotating power driven pulley 16 (Fig. 1), connected through a clutch 17 to a shaft 18, the clutch being operable by a hand lever 19. The shaft 18 operates through a Geneva drive to rotate the carriage step-by-step. The Geneva driving mechanism includes an arm 21 (Figs. 1 and 2) keyed to a shaft 22 driven from the shaft 18 through gearing in a gear box 23. A Geneva wheel 25 bolted to the carriage is formed with radial slots 26 to receive a driving roll 27 on the arm 21 for intermittently rotating the carriage, the carriage being held stationary between rotations by an arc-shaped holding member 28.

Each of the tube forming units comprises a horn or mandrel 31 around which blanks 32 of sheet material are wrapped to form tubes. Each mandrel is substantially cylindrical in form and is split lengthwise to form an upper section 33 and a lower section 34. The upper section 33 is attached by bolts 35 (Fig. 4) to the carriage. The lower section 34 is mounted for a limited up-and-down movement relative to the section 33 for collapsing and expanding the horn. The mechanism for expanding the horn includes a pair of bars 36 and 37 (Figs. 4 and 5) extending lengthwise within recesses formed in the lower and upper sections respectively of the horn and having cooperating inclined cam surfaces 38 and 43. The lower bar 36 is secured by bolts 39 to the horn section 34. The upper bar 37 is slidably mounted within the horn section 33.

The bar 37 is moved to the right (Fig. 4) for expanding the horn and held in such position, by means of a cam in the form of a wedge-shaped head 41, mounted for up-and-down sliding movement as hereinafter described. The inclined face of said head 41 bears against the inclined end surface 42 of the slide bar 37. When said head is moved upward, it forces the slide bar to the right, causing the inclined surfaces 43 of the slide bar to slide on the surfaces 38 of the lower bar and force the lower bar downward and thereby expand the horn. When the head 41 is drawn downward, the bar 37 is moved to the left by means of a coil spring 44 permitting the horn to be collapsed by coil tension springs 46 (Fig. 5) mounted in bores in the mandrel. The spring 44 is mounted in a bore formed in the squared end 45 of the upper horn section 33, said end being split or formed with a lower half 46 removably attached to the upper half by bolts 47. The spring is held under compression between the end of the slide bar 37 and an adjustable screw plug 48.

The blanks 32 may be fed automatically into position over the horn at the forming station by suitable feeding means (not shown). Each blank, as it is fed forward, has applied thereto a coating of hot glue or other adhesive along one of the marginal surfaces of the blank of which are overlapped and adhered to form a seam when the blank is given its tubular shape. The glue may be applied by means of a glue roll in a conventional manner and the blank or the seam forming margins thereof may also be heat treated by hot air supplied through pipes 49 (Figs. 6 and 8) and blowers 50.

The blanks are wrapped around the shaping horns or mandrels 31 by means of complementary shaping dies including an upper shaping die 51 mounted for vertical reciprocating movement on a stationary support, and lower shaping and clamping dies 52 individual to the mandrels and mounted to rotate with the carriage. Each die 52 is movable vertically upward on the carriage while at the forming station. The die members 51 and 52 have hemi-cylindrical shaping surfaces 54 and their margins are formed with fingers 55 which are interlaced when the dies are brought together. The upper die 51 which serves as a closing die operates when lowered to draw the blank to an inverted U shape, as shown in Fig. 7. The die 51 is carried on an arm 56 formed with a split sleeve 57 by which the arm is clamped to a vertical shaft 58 mounted for up-and-down movement in stationary bearing sleeves 59 and 60.

Means for reciprocating the shaft 58 comprises a rotary cam 61 keyed to a shaft 62 which may be geared to the drive shaft 18 for continuous rotation. The cam 61 is formed with a continuous cam track 66 in which runs a cam follower roll 67 mounted on a collar 68 secured to the shaft 58. The shaft 58 is held against rotative movement by a vertical guide rod 70 (Fig. 3) attached to an arm 71 clamped to the shaft 58, the rod 70 being slidable up and down in a bearing sleeve 72 on a bracket arm 73 bolted to the machine frame and formed with the aforementioned bearing sleeve 59. A coil spring 75 (Fig. 1) is attached at its lower end to the collar 68 and at its upper end is anchored to a post 76 on the machine frame. The spring is under tension and serves to counterbalance the weight of the shaft 58 and parts carried thereby.

Each of the shaping members or dies 52 is attached to or formed integral with a slide member 77 which is mounted for reciprocating movement radially of the carriage in guideways 78 on the associated arm 15. Each said slide member is formed with a web 79. A coiled tension spring 80 (Fig. 3) is attached at its upper end to the web 79 and at its lower end to a collar 81 or bearing ring which is free to rotate on the hub 82 of a cam 83. The slide member 77 is reciprocated under the control of two cams, namely, the cam 83 which is rotated continuously as hereinafter described, and a stationary cam 84 which is keyed to the stationary shaft 12 (Fig. 3). A cam follower roll 85 is journalled in a yoke 86 formed on the slide member 77. The roll 85 is arranged to engage both of the cams 83 and 84 which operate as hereinafter described to control the movements of the forming dies 52.

In order to guide the edges of the blank into overlapping relation as the blank is folded around the horn, each die 52 is provided with a pair of lapping fingers 87 which, as shown in Fig. 7, are formed with a guiding surface 88 which projects above the curved guiding surface of the die 52 into position to deflect the edge portion 89 of the blank upwardly or away from the curved surface of the die as indicated in Fig. 8, permitting the opposite edge of the blank to pass therebeneath. The fingers 87 are carried on stems 90 which extend downwardly through openings in a bracket 91 attached to the web 79. Coil compression springs 92 are mounted on the stems 90 and yieldingly hold the fingers in operative position, permitting them to be retracted as shown in Fig. 9 when the die 52 is moved upward.

The cam 83 is geared to the shaft 62 for continuous rotation by means of a sprocket chain 93 (Figs. 1 and 3) trained over a sprocket wheel 94 keyed to the shaft 62 and a sprocket wheel 95 secured by bolts 96 to the hub 82 of the cam 83. The cams 61 and 83 are rotated at the same angular speed and in synchronism with the intermittent rotation of the carriage 11, said cams making one complete rotation for each cycle of blank forming operations.

Operation

The operation is as follows:

Assuming the parts to be in the position shown in Fig. 6 with a blank 32 at the forming station, the upper die 51 is moved downward by its cam 61 while the carriage 11 is at rest, thereby folding the blank downward around the upper section 33 of the horn or mandrel, so that the blank is given an inverted U shape. The cam 83 then operates to lift the slide member 77 so that the lower die member 52 embraces the free ends of the blank as shown in Fig. 7 and gradually draws them inwardly and completes the wrapping of the blank around the horn. During this movement, one edge of the blank slides over the inclined surfaces 88 of the lapping fingers 87 and is thereby deflected upwardly relatively to the die as shown in Fig. 8, so that as the die continues its upward movement, the edges of the blank are brought to overlapping relation. During the final upward movement of the die 52, the cam head 41 engages the slide bar 37 (Fig. 4) and moves it to the right thereby expanding the horn. The blank, by these operations, has been brought to tubular form and clamped between the horn and the dies. As heated glue or the like has been applied to one of the contacting overlapping marginal surfaces of the blank, the margins are glued together and the adhesive is allowed to set while the blank is held clamped around the horn by the clamping die 52. The carriage 11 is now given a step rotation through 60° in a counter-clockwise direction to bring the next horn to the forming station. During this movement of the carriage the cam follower roll 85 is brought into engagement with the stationary cam 84, so that the die 52 is held thereby in clamping position while the cam 83 continues its rotation. Each blank, after it is shaped by the dies, is held clamped around the horn until the latter again nears the forming station. The cam follower roll 85 engages a low portion 84ᵃ of the cam 84 as the corresponding horn approaches the forming station. This permits the lower die 52 to be retracted by its spring 89, thereby withdrawing the head 41 (Fig. 4) and permitting the slide bar 37 to be moved inwardly by the spring 44 so that the horn is collapsed by the springs 49. As the lower die 52 is retracted, the upper die 51 is lifted by its cam, thus leaving the formed tube loosely mounted on the collapsed horn and free to be ejected therefrom. The ejecting means comprises a reciprocating slide bar 93ᵃ (Fig. 2) which may be operated by an air motor (not shown). It will be noted that each tube after it is formed, is held clamped on the horn by the die member 52 during the formation of a number of succeeding tubes which may be one less than the total number of forming units so that ample time is given for the glue or cementing material to set before the tube is released.

Modifications may be resorted to within the spirit and scope of my invention.

I claim:

1. A machine for forming tubes from flat blanks of sheet material, said machine comprising a carriage mounted for rotation about an axis, mandrels mounted on the carriage and brought in succession to a forming station by the rotation of the carriage, means cooperating with each mandrel at said station for wrapping a blank around the mandrel with its edges overlapped to form a seam, said wrapping means including clamping dies individual to the mandrels and mounted on the carriage for rotation therewith, means for holding each said die in position to clamp the formed tube to the mandrel during the formation of a plurality of succeeding tubes at said station, automatic means for releasing each said die from its mandrel before it is again brought to the forming station, each mandrel consisting of expansible sections, devices individual to the mandrels for expanding said sections and holding them expanded, said devices being connected to said dies and moved thereby to position to hold the mandrel sections expanded as the dies are moved into said clamping position, and means for collapsing the mandrels to permit the removal of the formed articles when the said dies are withdrawn.

2. A machine for forming tubes from blanks of sheet material, the said machine comprising a carriage mounted for rotation about an axis, a plurality of substantially cylindrical mandrels mounted on the carriage, means for rotating the carriage and thereby bringing the mandrels singly and in succession to a forming station, a shaping die mounted at said station for reciprocating movement toward and from each mandrel and operable during its movement toward the mandrel to fold or wrap a blank over the mandrel at said station, travelling dies individual to the mandrels and mounted on the carriage for reciprocation toward and from the mandrels, each of said shaping and travelling dies having a substantially hemicylindrical shaping surface curved to conform to the cylindrical surfaces of each of the mandrels, means for moving each said travelling die toward the mandrel while at said station in cooperation with and following the movement of said first mentioned die and thereby completing the wrapping of the blank around the mandrel and bringing the edges of the blank to overlapping relation and clamping the blank to the mandrel, means for maintaining each said travelling die in clamping position during the continued rotation of the carriage and the shaping of a succeeding blank, and automatic means for withdrawing each clamping die before it again reaches the forming station.

3. A machine for forming tubes from blanks of sheet material, said machine comprising a carriage mounted for rotation about a horizontal axis, an annular series of substantially cylindrical mandrels mounted on the carriage, means for intermittently rotating the carriage step-by-step and thereby bringing the mandrels in succession to a tube forming station with the carriage at rest during the formation of each tube, a shaping die positioned at said station, means for reciprocating said die toward and from each mandrel while the latter is held at rest at said station and thereby partly wrapping an interposed blank around each mandrel during the movement of the die toward the mandrel, cooperating dies individual to the mandrels and mounted on the carriage for rotation therewith and for reciprocation toward and from the mandrels, and means for moving each said cooperating die toward the mandrel while at said station and following the movement of the said shaping die toward the mandrel, thereby completing the wrapping of the blank around the mandrel and clamping the blank to the mandrel with its ends overlapped, said individual dies each having a shaping surface complemental to that of the first mentioned die and forming therewith a substantially cylindrical shaping surface conforming to that of the mandrels.

4. A machine for forming tubes from blanks of sheet material, said machine comprising a carriage mounted for rotation about a horizontal axis, an annular series of substantially cylindrical mandrels mounted on the carriage, means for intermittently rotating the carriage step-by-step and thereby bringing the mandrels in succession to a tube forming station with the carriage at rest during the formation of each tube, a shaping die positioned at said station and having a hemicylindrical concave shaping surface conforming to the contour of the mandrels, means for reciprocating said die toward and from each mandrel while the latter is held at rest at said station and thereby partly wrapping an interposed blank around each mandrel, the said shaping surface of the die being brought by said movement toward the mandrel, to a clamping position in which said surface is substantially concentric with the mandrel, cooperating dies individual to the mandrels and mounted on the carriage for rotation therewith and for reciprocation toward and from the mandrels and each having a hemicylindrical concave shaping surface complemental to said first mentioned shaping surface, means for moving each said cooperating die toward the mandrel while at said station and causing it during said movement to embrace the free ends of the blank and thereby complete the wrapping of the blank around the mandrel and clamp the blank to the mandrel with its ends overlapped, and means comprising a cam operable to hold each said travelling die in said clamping position during a major portion of a complete rotation of the carriage and for releasing the die before it again reaches the forming station.

5. A machine for forming tubes from blanks of sheet material comprising a plurality of mandrels, means for moving the mandrels in a closed path and bringing them in succession to a forming station, blank shaping means for wrapping a blank around each mandrel at said station, said shaping means including a die at said station for movement to and from the mandrel, travelling dies individual to the mandrels and travelling therewith, and means for moving said first mentioned die and a said travelling die in succession toward a mandrel while at the forming station and thereby wrapping a blank around the mandrel, said dies being formed with fingers along their margins which are interlaced by the movement of the dies to blank shaping position.

6. The combination of a mandrel, a support on which the mandrel is mounted, complementary dies having shaping surfaces corresponding to the contour of the mandrel, means for moving one said die toward the mandrel and bending an interposed blank of sheet material around a portion of the mandrel to a substantially U shape, means for then moving the other die toward the mandrel and completing the wrapping of the blank around the mandrel with the ends of the blank overlapped, and a lapping finger carried on said last mentioned die and projecting inwardly past the shaping surface of the die into position to deflect one edge of the blank inwardly to permit said overlapping, said finger being yieldingly mounted to permit it to be retracted by the back pressure of the blank thereagainst as the die is completing its said movement.

7. The combination of a substantially cylindrical mandrel, a pair of shaping dies mounted at opposite sides of the mandrel and having complementary concave substantially hemi-cylindrical shaping surfaces conforming to the contour of the mandrel, means for moving one said die toward the mandrel and bending an interposed blank to substantially U form and clamping it against the mandrel, means for thereafter moving the other die toward the mandrel and causing its said hemicylindrical surface to embrace the free edges of the blank and wrap the blank to surround the mandrel with its edges overlapping and forming a tube, and means for deflecting one edge portion of the blank away from the die to permit said overlapping of the said edges and clamping thereof between the die and mandrel.

8. The combination of a substantially cylindrical mandrel, a pair of shaping dies including a first and a second die mounted at opposite sides of the mandrel and having complementary concave substantially hemi-cylindrical shaping surfaces conforming to the contour of the mandrel, means for moving the first die toward the mandrel and bending an interposed blank to substantially U form and clamping it against the mandrel, means for thereafter moving the second die toward the mandrel and causing its said hemicylindrical surface to embrace the free edges of the blank and wrap the blank to surround the mandrel with its edges overlapping and forming a tube, and means for deflecting one edge portion of the blank away from the die to permit said overlapping of the said edges and clamping thereof between the second die and mandrel, said deflecting means comprising spring pressed fingers mounted to move with said second die and protruding beyond the said shaping surface thereof into the path of one edge of the blank and thereby deflecting it away from the die.

9. Means for forming a tubular body from a blank of sheet material, said means comprising a substantially cylindrical mandrel split longitudinally through a plane of its axis to form substantially hemicylindrical sections, said sections being movable to and from each other for collapsing and expanding the mandrel, said sections being formed with aligned bores extending therethrough perpendicular to the plane of cleavage of the mandrel, coil tension springs mounted in said bores and yieldingly holding the said sections together, expanding means for separating said sections, said expanding means comprising a slide bar extending lengthwise of the mandrel between said sections and formed with inclined cam surfaces, means providing cam engaging surfaces in fixed relation to a section of the mandrel and engaging the cam surfaces of the slide bar, and means for moving said slide bar lengthwise of the mandrel and thereby expanding the mandrel.

10. Means for forming tubes from blanks of sheet material comprising a substantially cylindrical mandrel split lengthwise to form separable sections movable to and from each other for collapsing and expanding the mandrel, a pair of complementary shaping dies positioned at opposite sides of the mandrel, means for moving first one die and thereafter the second die toward the mandrel and thereby wrapping an interposed blank of sheet material around the mandrel to form a tube with the ends of the blank overlapped and forming a seam held clamped to the mandrel by the said second die, and automatic means operable by said second die during its final movement to expand the mandrel within the tube.

11. Means for forming tubes from blanks of sheet material comprising a substantially cylindrical mandrel split lengthwise to form separable sections movable to and from each other for collapsing and expanding the mandrel, a pair of complementary shaping dies positioned at opposite sides of the mandrel, means for moving first one die and thereafter the second die toward the mandrel and thereby wrapping an interposed blank of sheet material around the mandrel to form a tube with the ends of the blank overlapped and forming a seam held clamped to the mandrel by the said second die, automatic means operable by said second die during its final movement to expand the mandrel within the tube, said expanding means comprising a slide bar mounted between the sections of the mandrel and extending lengthwise thereof, a cam connected to said second die and arranged to engage and move said slide bar lengthwise during the final movement of the said second die, and cam means operated by said movement of the slide bar to expand the mandrel.

12. A machine for forming tubes from blanks of sheet material, said machine comprising a stationary framework, a carriage mounted therein for rotation about a horizontal axis, cylindrical mandrels carried on said carriage and arranged in an annular series, means for intermittently rotating the carriage step-by-step and thereby bringing the mandrels in succession to a forming station at the upper side of the carriage and holding each mandrel stationary at said station for a predetermined time interval, a vertical shaft mounted for up-and-down movement in the framework, a wrapping die positioned at said station and connected to said shaft for up-and-down movement therewith, said die having a hemicylindrical concave wrapping surface operable by the downward movement of the die to wrap a said blank over the mandrel, the die being brought by said downward movement to a clamping position with the said wrapping surface concentric with the mandrel, shaping dies complementary to said wrapping die and individual to the mandrels and mounted on the carriage for rotation therewith and for reciprocating movement thereon toward and from their respective mandrels, automatic means for moving said shaft and first mentioned die downwardly for wrapping a blank on the mandrel at said station, and means for thereafter moving the complementary die at said station toward the mandrel, the complementary die having a hemicylindrical wrapping surface complemental to that of the first mentioned die and operable by its said movement toward the mandrel to complete the wrapping of the blank to the form of a tube.

FERDINAND KASTEL.

REFERENCES CITED

The following references are of record in the file of this patent:

UNITED STATES PATENTS

| Number | Name | Date |
|---|---|---|
| 1,076,536 | Warner | Oct. 21, 1913 |
| 1,876,931 | Heywood et al. | Sept. 13, 1932 |